US012617177B2

(12) United States Patent
Oueslati et al.

(10) Patent No.: US 12,617,177 B2
(45) Date of Patent: May 5, 2026

(54) AUTOMOTIVE GLAZING WITH VULNERABLE ROAD USER PROTECTION

(71) Applicant: Honda Motor Co., Ltd., Tokyo (JP)

(72) Inventors: Amir Oueslati, Marysville, OH (US); Brian Timothy O'Hara, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 18/301,443

(22) Filed: Apr. 17, 2023

(65) Prior Publication Data

US 2024/0343015 A1     Oct. 17, 2024

(51) Int. Cl.
| | |
|---|---|
| *B32B 3/26* | (2006.01) |
| *B60J 1/00* | (2006.01) |
| *B60J 1/02* | (2006.01) |
| *B32B 7/12* | (2006.01) |
| *B32B 17/10* | (2006.01) |

(52) U.S. Cl.
CPC .............. *B32B 3/266* (2013.01); *B60J 1/001* (2013.01); *B60J 1/02* (2013.01); *B32B 7/12* (2013.01); *B32B 17/10036* (2013.01); *B32B 2605/00* (2013.01); *Y10T 428/24273* (2015.01); *Y10T 428/24802* (2015.01); *Y10T 428/24926* (2015.01)

(58) Field of Classification Search
None
See application file for complete search history.

(56) References Cited

U.S. PATENT DOCUMENTS

| | | | |
|---|---|---|---|
| 5,162,145 A | * | 11/1992 | Schaefer ................... C03C 8/18 |
| | | | 428/209 |
| 8,287,958 B2 | | 10/2012 | Lyon et al. |
| 10,639,970 B2 | | 5/2020 | Irie et al. |
| 10,710,340 B2 | | 7/2020 | Mannheim Astete et al. |
| 11,260,629 B2 | | 3/2022 | Cleary et al. |
| 2005/0175844 A1* | | 8/2005 | Kramling .............. C03C 23/007 |
| | | | 428/426 |
| 2010/0098917 A1 | | 4/2010 | Lyon |
| 2021/0053423 A1 | | 2/2021 | Kanki |
| 2025/0050623 A1* | | 2/2025 | Walch ............... B32B 17/10036 |

FOREIGN PATENT DOCUMENTS

| | | |
|---|---|---|
| GB | 2088613 | 6/1982 |
| JP | 2022165696 | 11/2022 |
| WO | 2021255385 | 12/2021 |
| WO | 2022224911 | 10/2022 |

* cited by examiner

*Primary Examiner* — Zachary M Davis
(74) *Attorney, Agent, or Firm* — Mark E. Duell; Rankin, Hill & Clark LLP

(57) ABSTRACT

An optically transparent discontinuous arrangement of ceramic enamel in a daylight opening of an upright automotive glazing to provide a controlled fracture response of the glazing under impact from a vulnerable road user. The discontinuous arrangement of ceramic enamel may be tailored to offer a more consistent fracture response for the glazing, and provide a fracture response of the glazing that meets automotive regulations.

18 Claims, 3 Drawing Sheets

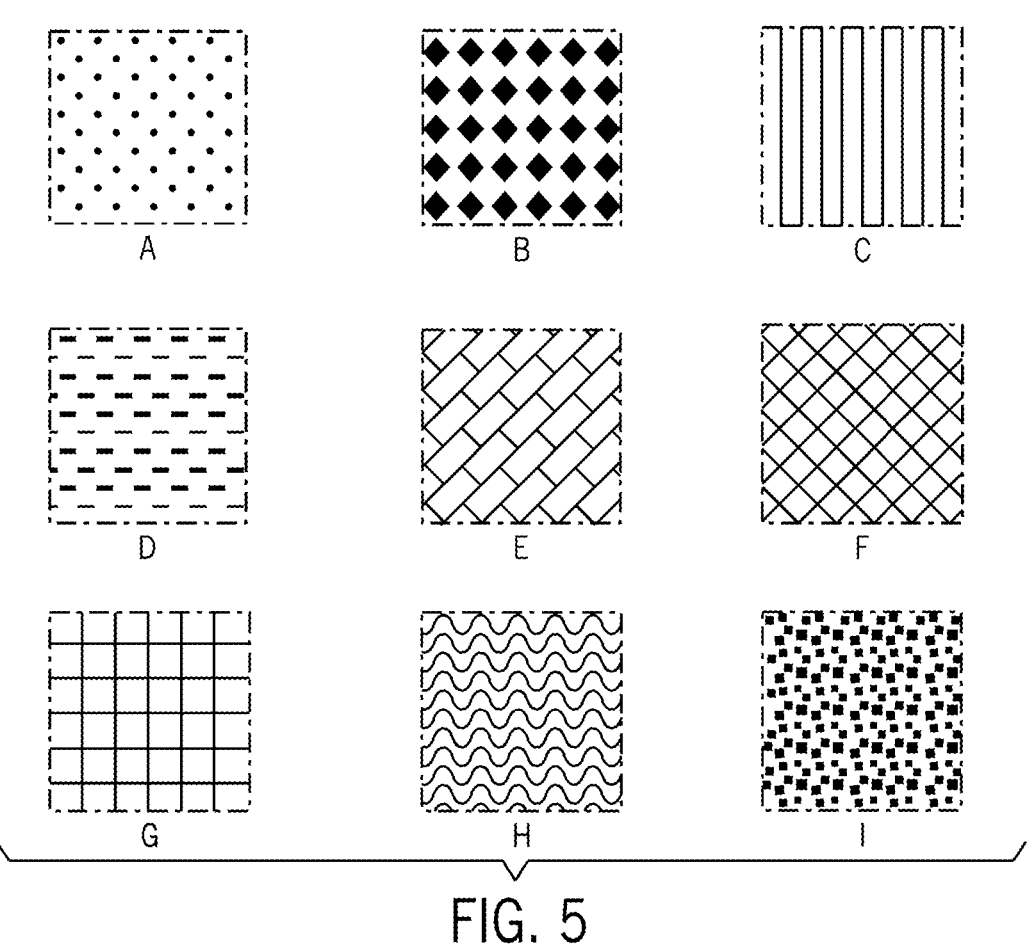
FIG. 5
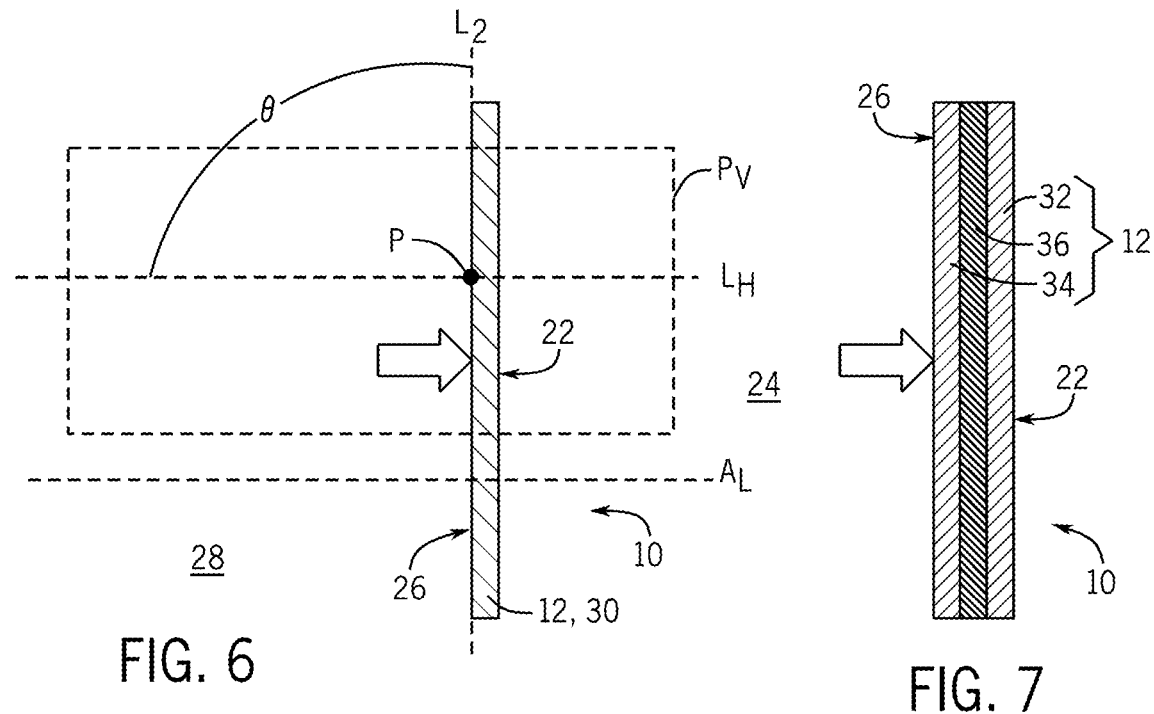
FIG. 6
FIG. 7

AUTOMOTIVE GLAZING WITH VULNERABLE ROAD USER PROTECTION

BACKGROUND

Glazing surfaces in automotive applications present challenges when considering impacts with vulnerable road users, e.g. pedestrians. Unlike metallic vehicle components, glazing surfaces often have significant variation in response under the same impact conditions. Typical glazing surfaces have highly variable impact responses/properties even though they are tested under the same conditions and may be identical to each other. This is because under impact, it is difficult to make the fracture response of the glazing surfaces consistent, which can lead to highly variable responses. Multiple impact tests from the same angle or speed often result in significant differences in the fracture response between the tests. The inconsistent impact response of glazings may be exacerbated in vehicles where the glazing is upright, or in situations where impacting bodies contact the glazing at a shallow relative angle.

BRIEF DESCRIPTION

According to one aspect, an upright automotive glazing includes a glass substrate with a daylight opening; a tinted band arranged on the glass substrate and extending around a perimeter of the daylight opening; and a discontinuous arrangement of ceramic enamel arranged in the daylight opening. The discontinuous arrangement of ceramic enamel controls a fracture response of the upright automotive glazing by weakening the upright automotive glazing such that the upright automotive glazing fractures when subjected to the Headform Test as described in United Nations ECE regulation 43, revision 4.

According to another aspect, a vehicle includes an upright automotive glazing. The upright automotive glazing includes a glass substrate with a daylight opening; a tinted band arranged on the glass substrate and extending around a perimeter of the daylight opening; and a discontinuous arrangement of ceramic enamel arranged in the daylight opening. The discontinuous arrangement of ceramic enamel controls a fracture response of the upright automotive glazing by weakening the upright automotive glazing such that the upright automotive glazing fractures when subjected to the Headform Test as described in United Nations ECE regulation 43, revision 4.

BRIEF DESCRIPTION OF THE DRAWINGS

FIG. 5 shows various discontinuous arrangements of ceramic enamel according to the present subject matter.

FIG. 6 is a cross section view of a glazing according to the present subject matter.

FIG. 7 is a cross section view of another glazing according to the present subject matter.

DETAILED DESCRIPTION

The problem of controlling the glazing surface (for example windscreens) fracture response to make it more consistent between tests is a problem for manufactures, since the windscreens often need to meet head impact regulations.

One test to assess the fracture properties of automotive glazing surfaces (e.g. windscreens) is the Headform Test as presented in the United Nations ECE Regulation No. 43 (UN-R43-00), revision 4 (2017), entitled the "Uniform provisions concerning the approval of safety glazing materials and their installation on vehicles". Another test to assess the fracture properties of automotive glazing surfaces is the Proposal for the 03 series of amendments to UN Regulation No. 127 (Pedestrian Safety). In these tests, under the same impact conditions, the fracture responses of similar windscreens to impact from a headform can be significantly different, wherein some windscreens fracture and some do not fracture.

This inconsistent fracture response can be exacerbated due to the vehicle architecture. The issue of inconsistent glazing surface fracture response can be exacerbated in vehicles where the glazing surface is more vertical, i.e. where the impact angle is close to 90° to the surface of the glazing, or where the headform contacts the glazing surface at a shallow relative angle, i.e. a "glancing blow" where the impact angle approaches being parallel to the glazing surface so less energy is directed into the glazing. An example of a more perpendicular impact angle with the glazing may be in a vehicle with a styling motif that has a glazing that is upright. The present subject matter addresses inconsistent fracture response in this situation, and may also be applicable to a traditional passenger vehicle shape with a sloped glazing (See FIGS. 1-2).

The present subject matter offers control of the fracture response (fracture vs. no fracture) of upright glazing surfaces upon impact, leading to more controlled performance under loading from an impacting body, and therefore meeting the impact response requirements or regulatory guidelines for automotive glazings.

The present subject matter includes an arrangement of weakenings, e.g. a discontinuous arrangement of "black ceramic" or similar enamel composition or a pigment treatment, in the daylight opening of an upright glazed automotive surface. This arrangement is designed to help control the fracture response under impact, while being optically transparent or having no significant visual impact on the glass transparency, and thus not impeding visibility through the daylight opening. The weakenings in the glazing may be defined by the black ceramic or other pigment treatment, or by other treatments to the glazing including chemical treatments such as etching or physical treatments such as microabrasion.

Figure 1:
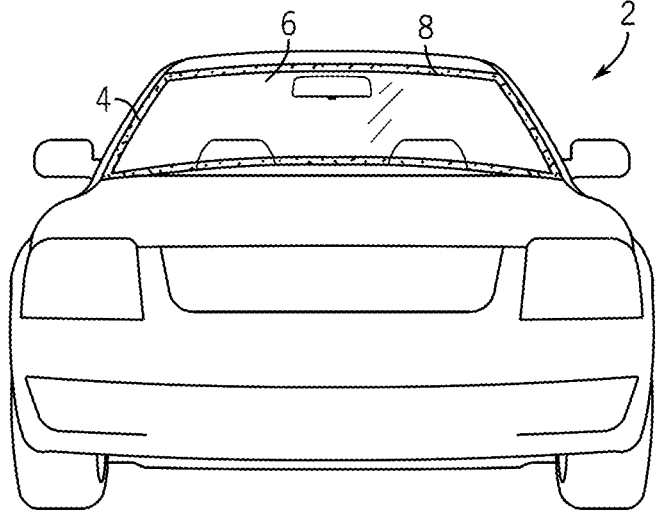
FIG. 1 is a front view of a prior art vehicle with a tinted band around a windscreen.
Figure 2:
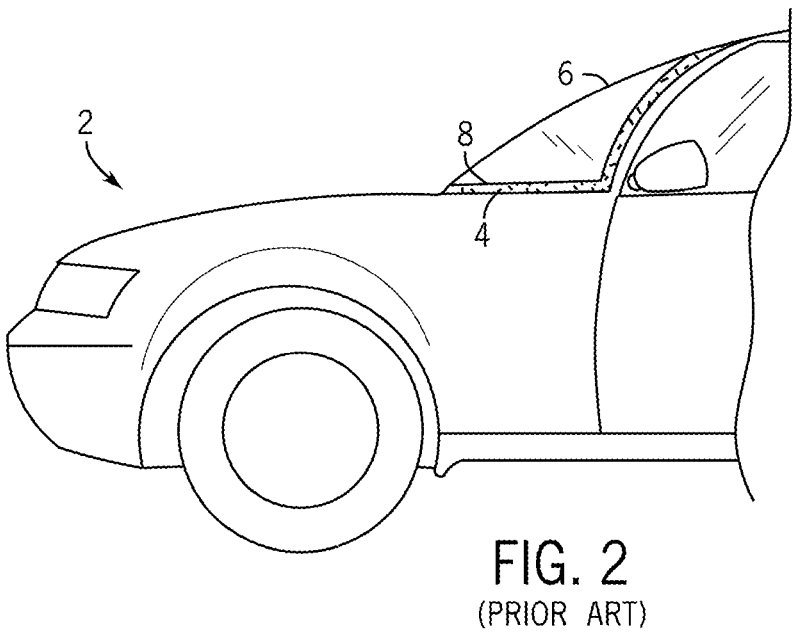
FIG. 2 is a partial side view of the prior art vehicle of FIG. 1.

As shown in FIGS. 1-2, prior art vehicles 2 include a ring 4 of black ceramic enamel around the perimeter of a transparent automotive glazing 6, which glazing 6 is slanted backward from the bottom of the automotive glazing 6, and thus is not upright. This ring 4 of black ceramic enamel may be used to hide and protect the connection between the glazing 6 and the rest of the vehicle 2, which typically formed by an adhesive that is subject to UV degradation, and/or to hide an "untrimmed" portion of the vehicle 2. The ring 4 is not see-through, and surrounds and defines the daylight opening 8 in the glazing 6, which daylight opening is transparent.

In an accident, a vulnerable road user, e.g. a pedestrian, may come into contact with the glazing 6 by hitting their head on the glazing 6. In order to protect the pedestrian and the pedestrian's head, the glazing 6 should reliably fracture under such an impact by having a consistent fracture response and energy absorption characteristic when impacted. However, the fracturing performance of a glazing 6 relies on the consistencies in the strength of the materials used to make the glazing 6 and the consistencies in the methods of making the glazing 6. Because there are natural variations in the strength of the materials used to make glazings 6 and in the methods of making the glazings 6, the glazings 6 may have a variation from one to another in their strength, and thus in their fracture response. Moreover, when the glazing 6 is slanted when mounted to the vehicle, the pedestrian's head may not contact the glazing 6 perpendicular to the surface of the glazing 6, but may strike the surface at an angle less than 90 degrees from the surface. This may cause the pedestrian's head to move up the glazing 6 upon impact, rather than strike it with enough force to cause the glazing 6 to fracture, thus resulting in less consistent fracture performances between otherwise similar glazings 6.

With reference to FIGS. 3-7, an upright automotive glazing 10 includes a transparent base 12 with a daylight opening 14. The glazing 10 includes a tinted band 16, e.g. of ceramic enamel, arranged on the base 12 and extending around a perimeter of the daylight opening 14. A discontinuous arrangement 18 of ceramic enamel is arranged on the transparent base 12 in the daylight opening 14.

It has been discovered that the discontinuous arrangement 18 of ceramic enamel in the daylight opening 14 has a propensity to fracture under impact loading more easily than the daylight opening 14 without the discontinuous arrangement 18.

The upright automotive glazing 10 may be arranged on a vehicle 20. The glazing 10 has two major surfaces and a perimeter defined by outer edges of the glazing 10. The two major surfaces are an inner surface 22 that faces an interior 24 of the vehicle 20, and an outer surface 26 that faces an exterior 28 of the vehicle 20. The glazing 10 may be curved or flat. If curved, the glazing 10 may have curves in one or more directions.

The glazing 10 may have one or more layers of material laminated or otherwise attached together. In FIG. 6, the glazing 10 has a single layer 30 defining both the inner surface 22 and the outer surface 26. In FIG. 7, the glazing 10 has a first layer 32, a second layer 34, and a third layer 36 arranged between the first and second layers 32, 34. The first layer 32 may define the inner surface 22 of the glazing 10, and the second layer 34 may define the outer surface 26 of the glazing 10. The tinted band 16 as well as the discontinuous arrangement 18 may each be applied to any of the layers 30, 32, 34, 36 and to any of their surfaces, including more than one of these layers and surfaces, for example, on the inner surface 22 of the glazing 10. The material composition of the layers 30, 32, 34, 36 is not particularly limited, and the layers 30, 32, 34, 36 may include a substrate of glass, polymers, ceramics, metals, or combinations or composites thereof, and these may be strengthened or otherwise modified with chemical treatments, thermal treatments (tempering), and/or by the applications of coatings thereto. In FIG. 7, the glazing 10 may be a laminated structure where the first and second layers 32, 34 include glass and the third layer 36 includes a polymer, e.g. an adhesive, laminating the first and second layers 32, 34 together. Over its area, the glazing 10 may have a consistent or varying thickness from the inner surface 22 to the outer surface 26. The glazing 10 may be used on the vehicle 20 as a windscreen (front window, See FIGS. 3-4), side window, back window, sunroof, or even a non-upright (slanted) window.

Figure 3:
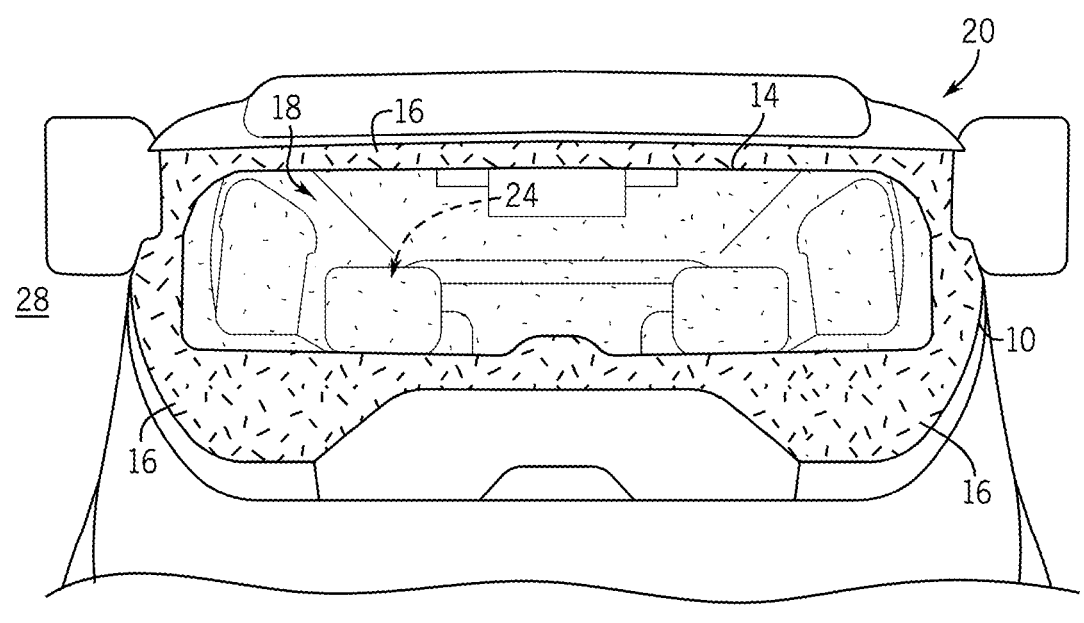
FIG. 3 is a partial front view of a vehicle including a discontinuous arrangement of ceramic enamel in a daylight opening of a glazing according to the present subject matter.
Figure 4:
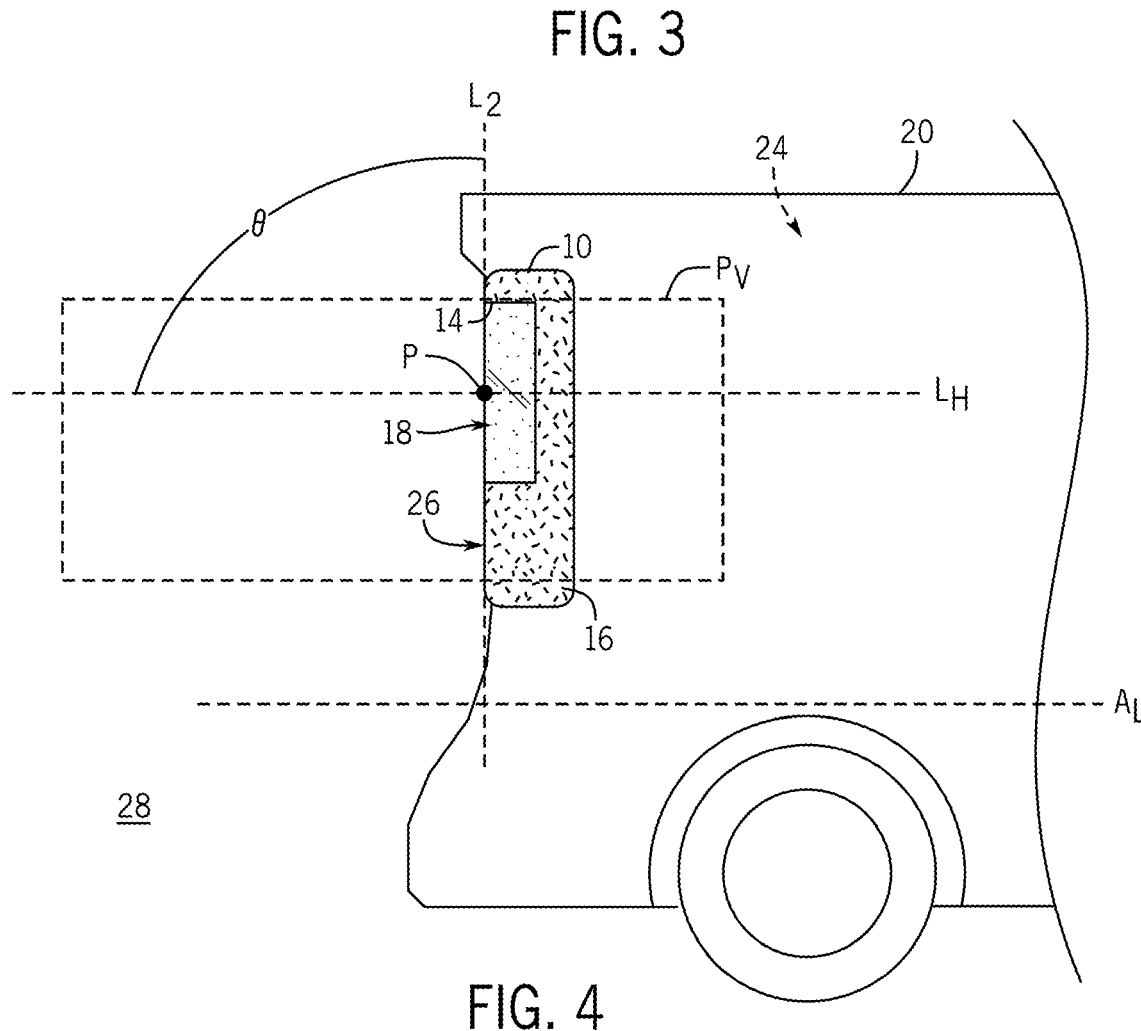
FIG. 4 is a partial side view of the vehicle of FIG. 3.

The upright automotive glazing 10 may be arranged on the vehicle 20 in an upright position, such as an upright windscreen (FIGS. 3-4). By "upright" and "upright position", it is meant that for the glazing 10 on the vehicle 20, a vertical plane $P_V$ extends parallel with a longitudinal axis $A_L$ of the vehicle 20. A horizontal line $L_H$ extends in the vertical plane $P_V$ and contacts the outer surface 26 of the glazing 10 at a point P not on an edge of the glazing 10. Another line $L_2$ extends in the vertical plane $P_V$ and through the point P, and is tangent to the outer surface 26 at the point P, or is coextensive to the outer surface 26 at the point P. The horizontal line $L_H$ forms an angle θ with the line L, the angle θ being 70°-110°, 80°-100°, 85°-95°, 89°-91°, 89.5°-90.5°, or 90°.

The glazing 10 may be attached to the vehicle 20 through various means, including by an adhesive around its perimeter. The band 16 may cover the adhesive and thus obscure the adhesive from view from the exterior 28.

The tinted band 16 may be a ceramic enamel coating, and may cover any amount of the glazing 10, as long as there remains a daylight opening 14 in the glazing 10. The band 16 may be opaque or translucent. The band 16 may be formed by any method, e.g. by screen printing a paste and firing the paste to remove the liquid vehicle and form the ceramic enamel.

The discontinuous arrangement 18 of ceramic enamel is arranged on the glazing 10 in the daylight opening 14. The discontinuous arrangement 18 includes areas 38 of ceramic enamel with voids 40 (i.e. areas with no ceramic enamel applied to the glazing 10) therebetween, and thus is not a continuous layer of ceramic enamel. The areas 38 of ceramic enamel may be in a random arrangement, may form a pattern (i.e. have a repeating design), or may include a combination thereof. The discontinuous arrangement 18 may be applied to a portion of the area of the daylight opening 14, or to an entirety of the area of the daylight opening 14. The areas 38 of ceramic enamel may include lines, or islands (of any shape) of ceramic enamel. The areas 38 of ceramic enamel may be connected or disconnected from each other. If lines are used, the lines may be straight, angled (e.g. zig zag), and/or curved.

The arrangement 18 may include, for example, the configurations shown in FIG. 5, in which the top of each drawing may be oriented toward a top of the glazing 10. The discontinuous arrangement 18 of ceramic enamel may include a pattern of dots (FIG. 5A), a pattern of diagonal squares (FIG. 5B), a pattern of vertical lines (FIG. 5C), a pattern of horizontal dashed lines (FIG. 5D), a pattern of diagonal lines forming a brick pattern (FIG. 5E), diagonal lines forming a diagonal grid pattern (FIG. 5F), vertical and horizontal lines forming a grid pattern (FIG. 5G), wavy lines (FIG. 5H), or random arrangement of dots (FIG. 5I), lines or shapes, other arrangements, and combinations thereof.

The areas 38 of ceramic enamel may applied to one or more of the layers of the glazing 10 by printing (e.g. screen printing), spraying, dipping, roll coating, or other application technique. The areas 38 of ceramic enamel may be applied contemporaneously or at a different time from the tinted band 16 of ceramic enamel, and may be applied to the same or different layer or surface of the glazing 10 than the tinted band 16.

The areas 38 of ceramic enamel may each have a CIELAB lightness value (L*) of less than 50. The areas 38 of ceramic enamel may be sized, spaced from each other, shaped, have a coating thickness, and/or have a pigment loading so that the overall discontinuous arrangement 18 of ceramic enamel is optically transparent, meaning it has a certain minimal transmission coefficient for visible light, and/or that the areas 38 cannot be seen from a certain minimum distance away from the glazing 10. The greatest dimension of each of the areas 38 of ceramic enamel, besides the length of lines if lines are used in the discontinuous arrangement 18, may be 1 mm or less. Because the discontinuous arrangement 18 of ceramic enamel is optically transparent, occupants of the vehicle 20 can see through the daylight opening 14 of the glazing 10. As depicted in FIG. 3, the daylight opening 14 is optically transparent even with the discontinuous arrange- ment 18 of ceramic enamel (wherein the areas 38 of ceramic enamel are schematically depicted for identification and not to show how they would actually appear on the glazing 10), and thus reveals the interior 24 of the vehicle 20.

The discontinuous arrangement 18 of ceramic enamel, because it is arranged in the daylight opening 14, allows the glazing 10 to have a more consistent fracture response when subjected to an impact, e.g. at the outer surface 26 (See arrows in FIGS. 6-7). While not being bound to any par- ticular theory, it is thought that each area 38 of ceramic enamel may provide a local weakening of the glazing 10 at the position where it is arranged, and an impact will cause the glazing 10 to begin to break at one of these local weakenings and then to spread throughout the rest of the glazing 10. When the discontinuous arrangement 18 of ceramic enamel is arranged over the entire area of the daylight opening 14, then the entire daylight opening 14 has these local weakenings associated with the areas 38 of ceramic enamel, and thus the discontinuous arrangement 18 of ceramic enamel provides the glazing 10 with a consistent fracture performance over the entire daylight opening 14. If these areas 38 of ceramic enamel were not provided, then different areas of the daylight opening 14 may have different fracture responses when subjected to an impact.

The discontinuous arrangement 18 of ceramic enamel may be configured such that characteristics of the areas 38 of ceramic enamel provide a desired fracture response for the glazing 10, e.g. to pass the Headform Test (UN-R43-00), revision 4 (2017). The discontinuous arrangement 18 of ceramic enamel may be thus configured, by modifying characteristics of the areas 38 of ceramic enamel, such as their size, their spacing from adjacent areas 38, their shape, their coating thickness, their pigment loading, or other characteristics. These characteristics may be tailored so as to influence the fracture response of upright glazings 10, e.g. to have the glazings 10 consistently fracture when subject to the same impact, and/or to pass the Headform Test as presented in the United Nations ECE Regulation No. 43 (UN-R43-00), revision 4 (2017), entitled the "Uniform provisions concerning the approval of safety glazing mate- rials and their installation on vehicles", while similar upright glazings without the discontinuous arrangement 18 may not consistently fracture when subject to the same impart or pass the Headform Test.

The discontinuous arrangement 18 of ceramic enamel may thus be configured, by modifying characteristics of the areas 38 of ceramic enamel, to control a fracture response of the upright automotive glazing 10 by weakening the upright automotive glazing 10 such that the upright automotive glazing 10 fractures when the daylight opening 14 is sub- jected to an impact in the Headform Test as described in United Nations ECE regulation 43, revision 4.

The impact from such a test may be directed at the outer surface 26, which may simulate real-life situations where the glazing 10 is arranged on the vehicle 20 and impacted by a road user on the outer surface 26. The impact from such a test may also be directed at the inner surface 22 of the glazing 10, which may simulate real-life situations where the glazing 10 is arranged on the vehicle 20 and impacted by a passenger of the vehicle 20.

The present subject matter provides the discontinuous arrangement 18 of ceramic enamel, e.g. a printed pattern, to the daylight opening 14 of the glazing 10. Ceramic enamel applied as a small patterns of dots, lines or other shapes may be printed in the daylight opening 14. This discontinuous arrangement 18 would include the areas 38 of ceramic enamel that may be small enough to not impede visibility through the daylight opening 14. Under impact loading, due to the relative weakness at the areas 38 of ceramic enamel as compared to the voids 40, fracture would be initiated at the areas 38 instead of in the glazing 10 at the voids 40. These areas 38 of relative weakness may provide a mecha- nism to control the fracture response of the glazing 10 under an impact condition (see arrows in FIGS. 6-7) against the outer surface 26.

Controlling the fracture response of the glazing 10 may be provided without changing the architecture (styling surfaces, body structure, etc.) of the vehicle 20, which may be normally required to affect the impact response of a glazing 10 without the discontinuous arrangement 18 of ceramic enamel in the daylight opening 14. The discontinuous arrangement 18 of ceramic enamel may be applied to the glazing 10 without having to change the architecture of the vehicle 20 or any surrounding components.

The present subject matter may help protect vulnerable road user if they come into contact with the glazing 10, e.g. during an accident where the road user's head or other body part strikes the glazing 10.

It will be appreciated that various of the above-disclosed and other features and functions, or alternatives or varieties thereof, may be desirably combined into many other differ- ent systems or applications. Also that various presently unforeseen or unanticipated alternatives, modifications, variations or improvements therein may be subsequently made by those skilled in the art which are also intended to be encompassed by the following claims.

The invention claimed is:

1. An upright automotive glazing comprising:

an upright glass substrate with a daylight opening;

a tinted band arranged on the glass substrate and extend- ing around a perimeter of the daylight opening, wherein the tinted band is opaque or translucent; and a discontinuous arrangement of ceramic enamel arranged in the daylight opening, wherein the discontinuous arrangement of ceramic enamel includes areas of ceramic enamel with voids therebetween;

wherein the discontinuous arrangement of ceramic enamel controls a fracture response of the upright automotive glazing by weakening the upright automo- tive glazing such that the upright automotive glazing fractures when subjected to the Headform Test as described in United Nations ECE regulation 43, revi- sion 4, wherein the discontinuous arrangement of ceramic enamel is configured to provide local weak- enings at positions where the areas of ceramic enamel are arranged such that the upright automotive glazing begins to break at one of the local weakenings and then spreads throughout the rest of the upright automotive glazing upon impact, wherein each of the areas of the ceramic enamel have a CIELAB lightness value of less than 50, and the discontinuous arrangement of ceramic enamel is opti- cally transparent.

2. The upright automotive glazing of claim 1, wherein:
the Headform Test includes subjecting the daylight opening to an impact; and
the upright automotive glazing fractures in the daylight opening when subjected to the impact.

3. The upright automotive glazing of claim 2, wherein the Headform Test includes subjecting an outer surface of the upright automotive glazing to the impact.

4. The upright automotive glazing of claim 2, wherein the Headform Test includes subjecting an inner surface of the upright automotive glazing to the impact.

5. The upright automotive glazing of claim 1, wherein the upright automotive glazing is a vehicle windscreen.

6. The upright automotive glazing of claim 1, wherein the discontinuous arrangement of ceramic enamel is arranged over an entirety of the daylight opening.

7. The upright automotive glazing of claim 1, wherein the discontinuous arrangement of ceramic enamel includes a pattern of dots, a pattern of diagonal squares, a pattern of vertical lines, a pattern of horizontal dashed lines, a pattern of diagonal lines forming a brick pattern, diagonal lines forming a diagonal grid pattern, vertical and horizontal lines forming a grid pattern, wavy lines, or random arrangement of dots, lines or shapes.

8. The upright automotive glazing of claim 1, wherein the discontinuous arrangement of ceramic enamel forms a pattern.

9. The upright automotive glazing of claim 1, wherein the tinted band is made of ceramic enamel.

10. The upright automotive glazing of claim 1, wherein the discontinuous arrangement of ceramic enamel is arranged on an inner surface of the upright automotive glazing.

11. A vehicle comprising an upright automotive glazing, the upright automotive glazing including:
an upright glass substrate with a daylight opening;
a tinted band arranged on the glass substrate and extending around a perimeter of the daylight opening, wherein the tinted band is opaque or translucent; and
a discontinuous arrangement of ceramic enamel arranged in the daylight opening, wherein the discontinuous arrangement of ceramic enamel includes areas of ceramic enamel with voids therebetween;

wherein the discontinuous arrangement of ceramic enamel controls a fracture response of the upright automotive glazing by weakening the upright automotive glazing such that the upright automotive glazing fractures when subjected to the Headform Test as described in United Nations ECE regulation 43, revision 4, wherein the discontinuous arrangement of ceramic enamel is configured to provide local weakenings at positions where the areas of ceramic enamel are arranged such that the upright automotive glazing begins to break at one of the local weakenings and then spreads throughout the rest of the upright automotive glazing upon impact,
wherein each of the areas of the ceramic enamel have a CIELAB lightness value of less than 50, and the discontinuous arrangement is optically transparent.

12. The vehicle of claim 11, wherein the upright automotive glazing is a windscreen of the vehicle.

13. The vehicle of claim 12, wherein the upright automotive glazing is arranged in an upright position on the vehicle.

14. The vehicle of claim 11, wherein:
the Headform Test includes subjecting the daylight opening to an impact; and
the upright automotive glazing fractures in the daylight opening when subjected to the impact.

15. The vehicle of claim 14, wherein the Headform Test includes subjecting an outer surface of the upright automotive glazing to the impact.

16. The vehicle of claim 14, wherein the Headform Test includes subjecting an inner surface of the upright automotive glazing to the impact.

17. The vehicle of claim 11, wherein the discontinuous arrangement of ceramic enamel is arranged over an entirety of the daylight opening.

18. The vehicle of claim 11, wherein the discontinuous arrangement of ceramic enamel includes a pattern of dots, a pattern of diagonal squares, a pattern of vertical lines, a pattern of horizontal dashed lines, a pattern of diagonal lines forming a brick pattern, diagonal lines forming a diagonal grid pattern, vertical and horizontal lines forming a grid pattern, wavy lines, or random arrangement of dots, lines or shapes.

* * * * *